United States Patent [19]

Brugmans

[11] 4,340,638

[45] Jul. 20, 1982

[54] METALLIZED LABELS

[75] Inventor: Johannes T. Brugmans, Enkhuizen, Netherlands

[73] Assignee: Koninklijke Emballage Industrie Van Leer B.V., Amstelveen, Netherlands

[21] Appl. No.: 138,054

[22] Filed: Apr. 7, 1980

[30] Foreign Application Priority Data

Feb. 15, 1980 [NL] Netherlands ......................... 8000965

[51] Int. Cl.$^3$ ........................ B32B 15/08; B32B 15/16
[52] U.S. Cl. ..................................... 428/323; 40/2 R; 40/310; 428/411; 428/35; 428/463; 428/464; 428/522; 428/914
[58] Field of Search ............... 428/914, 464, 463, 411, 428/522, 35, 323; 40/310, 2 R

[56] References Cited

U.S. PATENT DOCUMENTS

| | | | |
|---|---|---|---|
| 2,293,420 | 8/1942 | Wick | 428/463 |
| 2,613,168 | 10/1952 | Totten, Jr. | 428/464 |
| 2,983,641 | 5/1961 | McConaughy | 428/463 |
| 4,215,170 | 7/1980 | Oliva | 428/464 |

*Primary Examiner*—Ellis P. Robinson
*Attorney, Agent, or Firm*—Lawrence Rosen

[57] ABSTRACT

A metallized label for containers, coated with a lacquer comprising a resin and 2 to 10 weight % (calculated on the amount of resin in said lacquer) of additives selected from the group consisting of sucrose, mannitol and urea, which do not attack the metal of said label and which are soluble in aqueous caustic soda solution, containing 1.5 weight % of the caustic soda having a temperature of 80° C.

10 Claims, No Drawings

METALLIZED LABELS

The present invention relates to metallised labels for containers such as bottles, coated with a lacquer comprising 2 to 10 weight % (calculated on the amount of resin in said lacquer) of additives, which do not attack the metal of said labels and which are soluble in an aqueous caustic soda solution, containing 1.5 weight % of caustic soda, having a temperature of 80° C.

It is known that in the labelling industry there is a requirement for labels having a metallic appearance. It is obvious to use for that purpose a metallic foil, in particular an aluminium foil. However, such a foil is not suitable for use with returnable bottles, since such labels can not be removed by using standard techniques, involving immersion in a bath of 1.5 weight % of caustic soda, having a temperature of 80° C., within a period of 3 minutes. Further in such a bath metallic foil labels react with caustic soda, due to which its strength is reduced such that the caustic soda has to be changed frequently.

For said reasons, it would be advantageous to use metallised papers for this purpose, since such papers have a low metal content in comparison with a metallic foil. Metallised papers are generally known. A very useful type is disclosed in DPA No. 80.00967 as with a foil label the requirements are the same of which the chief are appearance and ease of removal in the above caustic soda solution. Lacquers, preferably acrylic resin based lacquers, are used to provide protection for the metallic layer against water and oxygen and also to enable the product to perform satisfactorily on labeling machines.

In order to enable a metallised label to be satisfactorily removed from a bottle, it is necessary that the hot caustic soda solution can attack the adhesive layer between bottle and paper. For this to occur within a relatively short time, the caustic soda has to rapidly reach the paper layer. That is to say it must rapidly pass through the lacquer and metallised layer. The latter problem is obviated with this invention in that a very thin layer of metal which has been vacuum deposited in the label construction will be readily dissolved by the caustic soda solution.

There are two potential ways of achieving the desired penetration of the lacquer.
 solubility of lacquer
 thickness of lacquer The commercially available lacquers which are readily dissolved by dilute alkali are ideally suited for applications involving direct metallising where the lacquer is applied after metallising. However, the resultant products from direct metallising have an inferior mirror reflectivity as compared with indirect metallised papers.

Such lacquers which are used for direct metallised labels are not suitable in the indirect process where the lacquer is applied before metallising because the lacquer must have low volatiles at reduced pressures.

Lacquers soluble in dilute alkali and having low volatiles under reduced pressure are not commercially available.

It would be possible to employ a thin lacquer layer thereby allowing the caustic soda to reach the metallised layer by a permeation mechanism. This has appeared to be unsatisfactory. If the lacquer thickness is less than about 1.7 µm, interference fringes may occur which detract from the end product's appearance.

It was found now, that metallised labels glued to bottles by means of a glue that is not resistant against an aqueous caustic soda solution containing 1.5% by weight of caustic soda, at a temperature of 80° C., may be removed within a period of 3 minutes from said bottles, by using labels coated with a lacquer wherein 2 to 10 weight % hot dilute alkali soluble additives that do not attack the metal layer of said label have been incorporated. When said additives have been dissolved in said alkaline solution, the lacquer coating starts to crack or to split and to swell. Subsequently the underlying metallic layer is dissolved and finally the paper substrate and glue (caseine based) are attacked. Such additives may be dissolved and subsequently dispersed or directly ground into the lacquer. The preferred lacquers are those used in DPA No. 80.00967. Preferably said additives are distributed in said lacquer at a particle size of up to 2 µm.

Further it is preferred that said additives are Food and Drug Act (FDA) approved.

It is preferred that said additives do not react with caustic soda and have a low vapor pressure.

In many cases it is preferred that said additives are colourless or clear.

Preferred additives are sucrose, mannitol and urea.

The mirror reflectivity of a sample surface can be measured by adhering a 150 mm×200 mm sample to a smooth flat glass surface. At an angle of 60° to the sample is placed a 150 mm×250 mm grid on which is marked 10 mm squares and numerals 1–25 in the vertical direction. The sample surface is illuminated by standard photographic lamps A 5"×4" Micro Precision Products Technical Camera with a Schneider Xenar 1:4.5/150 lens and aperture F16 is situated 500 mm from the point of contact of grid and sample at an angle of 30° to sample. The focus is on the reflected numeral 1 from the grid and a photograph is taken. The mirror reflectivity of the sample surface is determined by examination of the photograph to see the highest number at which a clear reflected image is obtained. This number gives the mirror reflectivity rating of the sample surface.

EXAMPLE 1

A lacquer solution was prepared by dissolving 100 parts by weight of Bakelite Vinyl Solution Resin VMCH in 300 parts by weight of butanone-2. The resultant lacquer solution was applied to the carrier film at a dry coating weight of 2.2 grams per square meter (gsm) using a drying temperature of 70° C.

A coherent continuous stratum of aluminium metal was then vapour deposited by standard methods upon this lacquer layer.

A layer of solvent based laminating adhesive Adcote 340 was applied to the metal layer at a dry coating weight of 2.4 gsm to bond the carrier (Hescolina Base paper (60 gsm)) to the composite.

After 7 days, the carrier film was stripped from the composite structure to produce a laminar product which had a mirror reflectivity rating of 5, according to the method described in the text.

From the resultant laminar product was cut a 100 mm×100 mm label which was bonded to a glass bottle using a standard casein glue (ex Houtstra). After 7 days storage at ambient conditions, the bottle plus label was immersed in a 1.5% aqueous caustic soda solution at 80° C.

The label failed to release after 25 minutes.

EXAMPLE 2

3.0 parts by weight of sucrose were dissolved in 9 parts of water and this solution was mixed into a lacquer solution comprising 100 parts by weight of Bakelite Vinyl Solution Resin VMCH, 300 parts by weight of butanone-2. The resultant lacquer solution was applied to a polypropylene carrier film at a dry coating weight of 2.4 gsm using a drying temperature of 70° C.

A coherent continuous stratum of aluminium metal was then vapour deposited by standard methods upon this lacquer layer.

7.5 parts by weight of sucrose were dissolved in 22.5 parts of water and this was mixed into a laminating adhesive solution comprising 100 parts of Adcote 340, 115 parts by weight of methanol and 15 parts of catalyst. The resultant laminating adhesive solution was applied to the metal layer at a dry coating weight of 3.0 gsm to bond the Hescolina Base Paper (60 gsm) to the composite.

After 7 days, the carrier film was stripped from the composite structure to produce a laminar product which had a mirror reflectivity rating of 4, determined according to the method described in the text.

From the resultant laminar product was cut a 100 mm × 100 mm label which was bonded to a glass bottle using a standard casein glue. After 7 days storage at ambient conditions, the bottle plus label was immersed in a 1.5% aqueous caustic soda solution at 80° C.

The label released from the bottle after 7 minutes.

EXAMPLE 3

A lacquer solution was prepared by dissolving 70 parts by weight of Neocryl B811, methacrylic homopolymer (ex Polyvinyl Chemie) and 30 parts by weight of Vinnol H40/55 a vinyl chloride/acrylacetate copolymer (ex Wacker) in 210 parts by weight of butanone-2 and 90 parts by weight of ethyl acetate.

The resultant lacquer was applied to the polyester carrier film at a dry coating weight of 2.5 gsm using a drying temperature of 70° C.

A coherent continuous stratum of aluminum metal was then vapour deposited by standard methods upon this lacquer surface.

A layer of an aqueous based styrene butadiene emulsion adhesive was applied to the metal layer at a dry coating weight of 4 gsm to bond the substrate (Hescolina base paper (60 gsm)) to the composite.

After 7 days, the carrier film was stripped from the composite structure to produce a laminar product with a mirror reflectivity of 5. From the resultant laminar product was cut a 100 mm × 100 mm label which was bonded to a glass bottle using a standard casein glue. After 7 days storage at ambient conditions, the bottle plus label was immersed in a 1.5% caustic soda solution at 80° C.

The label released from the bottle after 14 minutes.

EXAMPLE 4

As Example 3 but 3 parts by weight of sucrose dissolved in 9 parts by weight of water were added to the lacquer.

Mirror reflectivity rating of 4.

The label removal time was 3.5 minutes.

EXAMPLE 5

As Example 3 but 3 parts by weight of sucrose were ground into the lacquer.

Mirror reflectivity rating of 5.

The label removal time was 158 seconds.

EXAMPLE 6

As Example 3 but 5 parts by weight of dextrose monohydrate were ground into the lacquer.

Mirror reflectivity rating of 4.

The label removal time was 130 seconds.

EXAMPLE 7

As Example 3 but 7 parts by weight of sucrose were ground into the lacquer.

Mirror reflectivity rating of 4.

The label removal time was 220 seconds.

EXAMPLE 8

A lacquer solution was prepared by dissolving 75 parts by weight of Neocryl B 811 and 25 parts by weight of Vinnol H 40/55 in 210 parts by weight of butanone-2 and 90 parts by weight of ethyl acetate. To this solution were added 3 parts by weight of sucrose dissolved in 9 parts by weight of water. The resultant lacquer solution was applied to the polyester carrier film at a dry coating weight of 2.6 gsm using a drying temperature of 70° C.

Then as Example 3.

Mirror reflectivity 4.

The label released from the bottle after 105 seconds.

EXAMPLE 9

As Example 8 but 5 parts by weight of sucrose were ground into the lacquer.

Mirror reflectivity 4.

The label released from the bottle after 95 seconds.

EXAMPLE 10

A lacquer solution was prepared by dissolving 80 parts by weight of Neocryl B811 and 20 parts by weight of Vinnol H 40/55 in 210 parts by weight of butanone-2 and 90 parts by weight of ethyl acetate. To this solution were added 5 parts by weight of sucrose dissolved in 15 parts by weight of water. The resultant lacquer solution was applied to the polyester carrier film at a dry coating weight of 2.6 gsm using a drying temperature of 70° C.

Then as Example 3.

Mirror reflectivity 4.

The label released from the bottle after 115 seconds.

EXAMPLE 11

As example 10 but 5 parts by weight of sucrose were ground into the lacquer.

Mirror reflectivity 5.

The label removal time was 96 seconds.

I claim:

1. Metallised label for containers such as bottles, coated with a lacquer comprising at least one of a methacrylic homopolymer and a vinyl chloride-vinyl acetate copolymer and comprising 2 to 10 weight % (calculated on the amount of resin in said lacquer) of additives, which do not attack the metal of said labels and which are soluble in an aqueous caustic soda solution, containing 1.5 weight % of the caustic soda, having a temperature of 80° C.

2. Metallised labels, according to claim 1 characterised in that said additives have a particle size of up to 2 μm.

3. Metallised labels according to claim 1 characterised in that said additives do not react with caustic soda.

4. Metallised labels according to claim 1 characterised in that said additives have a low vapour pressure.

5. Metallised labels according to claim 1 characterised in that said additives are clear.

6. Metallised labels according to claim 1 characterised in that sucrose is used as said additive.

7. Metallised labels according to claim 1 characterised in that mannitol is used as said additive.

8. Metallised label according to claim 1 characterised in that urea is used as said additive.

9. Metallised label according to claim 1 applied to bottles.

10. Metallised label for containers such as bottles, coated with a lacquer comprising 2 to 10 weight % (calculated on the amount of resin in said lacquer) of additives selected from the group consisting of sucrose, mannitol and urea, which do not attack the metal of said labels and which are soluble in an aqueous caustic soda solution, containing 1.5 weight % of the caustic soda having a temperature of 80° C.

* * * * *